United States Patent
Meylan et al.

(10) Patent No.: US 12,150,130 B2
(45) Date of Patent: Nov. 19, 2024

(54) SPLIT DATA THRESHOLD ADJUSTMENTS IN A WIRELESS WIDE AREA NETWORK (WWAN)

(71) Applicant: QUALCOMM Incorporated, San Diego, CA (US)

(72) Inventors: Arnaud Meylan, San Diego, CA (US); Leena Zacharias, San Jose, CA (US); Michel Chauvin, San Diego, CA (US); Akshay Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/567,076

(22) Filed: Dec. 31, 2021

(65) Prior Publication Data
US 2023/0217446 A1 Jul. 6, 2023

(51) Int. Cl.
*H04W 72/21* (2023.01)
*H04W 28/02* (2009.01)
*H04W 72/542* (2023.01)

(52) U.S. Cl.
CPC ......... *H04W 72/21* (2023.01); *H04W 72/542* (2023.01)

(58) Field of Classification Search
CPC ... H04W 72/21; H04W 72/52; H04W 72/542; H04W 28/02; H04W 72/02; H04L 47/30
See application file for complete search history.

(56) References Cited

U.S. PATENT DOCUMENTS

| | | | |
|---|---|---|---|
| 11,617,186 B2* | 3/2023 | Jia | H04L 45/24 370/329 |
| 11,711,737 B1* | 7/2023 | Marupaduga | H04W 36/008357 455/436 |
| 11,831,365 B1* | 11/2023 | Marupaduga | H04B 7/0413 |
| 2019/0098606 A1* | 3/2019 | Sharma | H04B 7/0404 |
| 2021/0051767 A1* | 2/2021 | Zhang | H04W 76/34 |
| 2022/0095325 A1* | 3/2022 | Kumar | H04W 72/52 |
| 2022/0394583 A1* | 12/2022 | Deenoo | H04W 24/08 |
| 2023/0014946 A1* | 1/2023 | Sambhwani | H04L 47/83 |
| 2023/0284106 A1* | 9/2023 | Teyeb | H04W 36/0069 370/331 |
| 2023/0363028 A1* | 11/2023 | Da Silva | H04W 76/15 |
| 2023/0388790 A1* | 11/2023 | Nakarmi | H04L 63/0478 |
| 2023/0403754 A1* | 12/2023 | Subramanian | H04W 76/16 |
| 2024/0080833 A1* | 3/2024 | Jeon | H04W 76/38 |

* cited by examiner

Primary Examiner — Khawar Iqbal
(74) Attorney, Agent, or Firm — Holland & Hart LLP

(57) ABSTRACT

Certain aspects of the present disclosure provide techniques for configuring a device-configured split data threshold for utilizing split data radio bearers (DRBs). A method that may be performed at a user equipment (UE) includes setting a device-configured split data threshold to a value that is less than or equal to a network-configured split data threshold value in response to the network-configured split data threshold value being greater than a first buffer threshold value associated with a data buffer of the UE, monitoring an amount of data in the data buffer, and triggering a first scheduling request (SR) associated with a first communication link and a second SR associated with a second communication link in response to the amount of data in the data buffer being greater than the device-configured split data threshold value.

20 Claims, 11 Drawing Sheets

SPLIT DATA THRESHOLD ADJUSTMENTS IN A WIRELESS WIDE AREA NETWORK (WWAN)

INTRODUCTION

Aspects of the present disclosure relate to wireless communications, and more particularly, to techniques for performing split data threshold adjustments for establishing split data radio bearers (DRBs).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects relate to a method for wireless communications at a user equipment (UE). In some examples, the method includes setting a device-configured split data threshold to a value that is less than or equal to a network-configured split data threshold value in response to the network-configured split data threshold value being greater than a first buffer threshold value associated with a data buffer of the UE. In some examples, the method includes monitoring an amount of data in the data buffer. In some examples, the method includes triggering a first scheduling request (SR) associated with a first communication link and a second SR associated with a second communication link in response to the amount of data in the data buffer being greater than the device-configured split data threshold value.

Certain aspects relate to an apparatus for wireless communications, comprising a memory comprising instructions, and one or more processors configured to execute the instructions. In some examples, the instructions cause the apparatus to set a device-configured split data threshold to a value that is less than or equal to a network-configured split data threshold value in response to the network-configured split data threshold value being greater than a first buffer threshold value associated with a data buffer of the apparatus. In some examples, the instructions cause the apparatus to monitor an amount of data in the data buffer. In some examples, the instructions cause the apparatus to trigger a first scheduling request (SR) associated with a first communication link and a second SR associated with a second communication link in response to the amount of data in the data buffer being greater than the device-configured split data threshold value.

Certain aspects relate to a method for wireless communications at a user equipment (UE). In some examples, the method includes monitoring data in a buffer associated with the UE in response to a network-configured split data threshold being less than a first threshold associated with the buffer. In some examples, the method includes triggering a first scheduling request (SR) associated with a first communication link and a second SR associated with a second communication link based, at least in part, on a buffer latency realized from the monitoring of the data in the buffer.

Certain aspects relate to an apparatus for wireless communications, comprising a memory comprising instructions, and one or more processors configured to execute the instructions. In some examples, the instructions cause the apparatus to monitor data in a buffer associated with the apparatus in response to a network-configured split data threshold being less than a first threshold associated with the buffer. In some examples, the instructions cause the apparatus to trigger a first scheduling request (SR) associated with a first communication link and a second SR associated with a second communication link based, at least in part, on a buffer latency realized from the monitoring of the data in the buffer.

Other aspects provide: a UE operable, configured, or otherwise adapted to perform the aforementioned methods as well as those described elsewhere herein; a non-transitory, computer-readable media comprising instructions that, when executed by one or more processors of an apparatus, cause the UE to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums performing split data threshold adjustments for utilizing split data radio bearers (DRBs).

Introduction to Wireless Communication Networks

Figure 1:
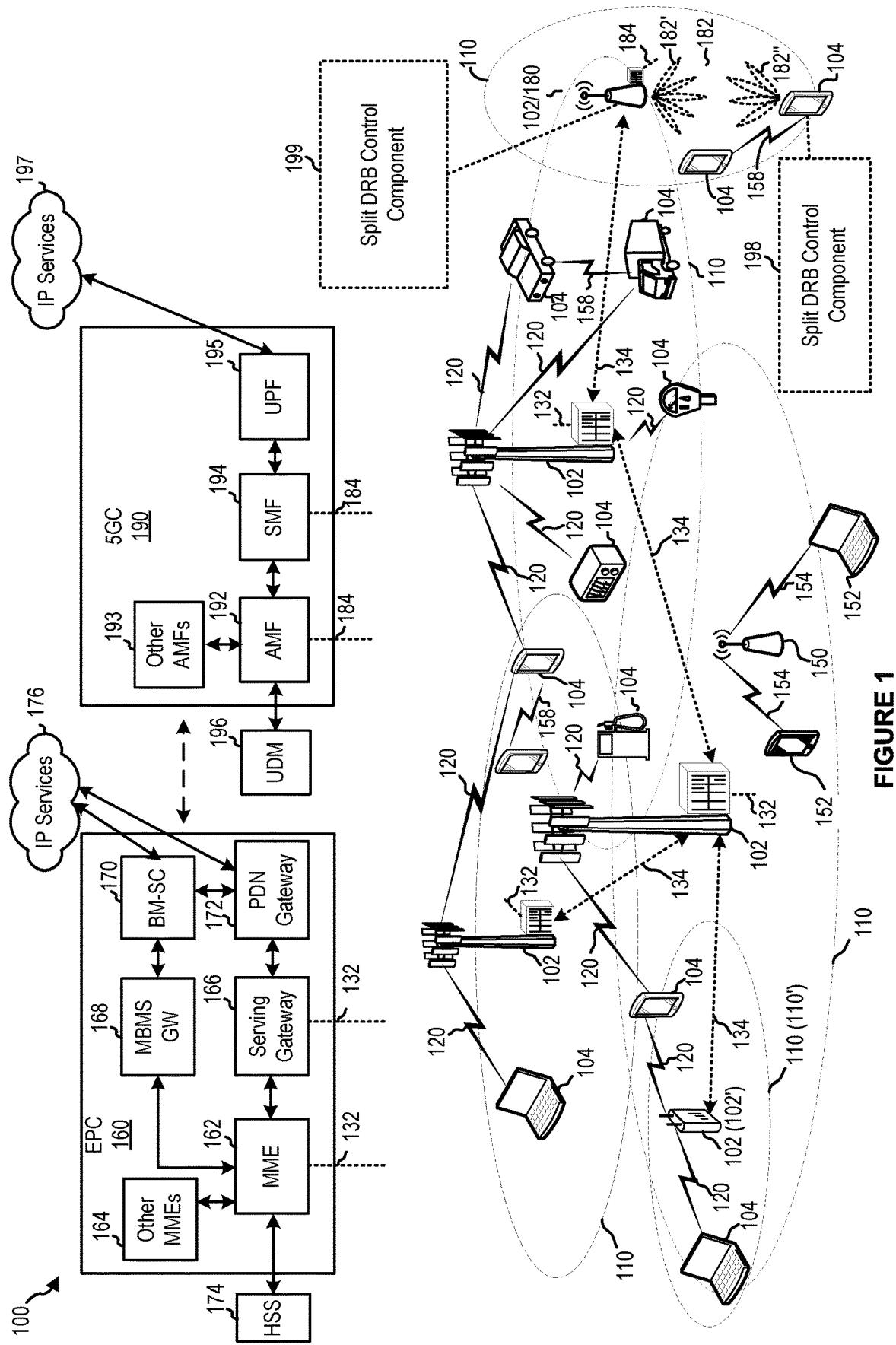
FIG. 1 is a block diagram conceptually illustrating an example wireless communication network.

FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, a transceiver function, a transmitter receiver point (TRP), or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes a split DRB control component 199, which may be configured to perform the operations for managing schedule requests (SRs) and utilizing split DRBs. Wireless communication network 100 further includes a split DRB control component 198, which may be configured to perform the operations in one or more of FIG. 8 or FIG. 9, as well as other operations described herein for adjusting a split data threshold for utilizing split DRBs.

Figure 2:
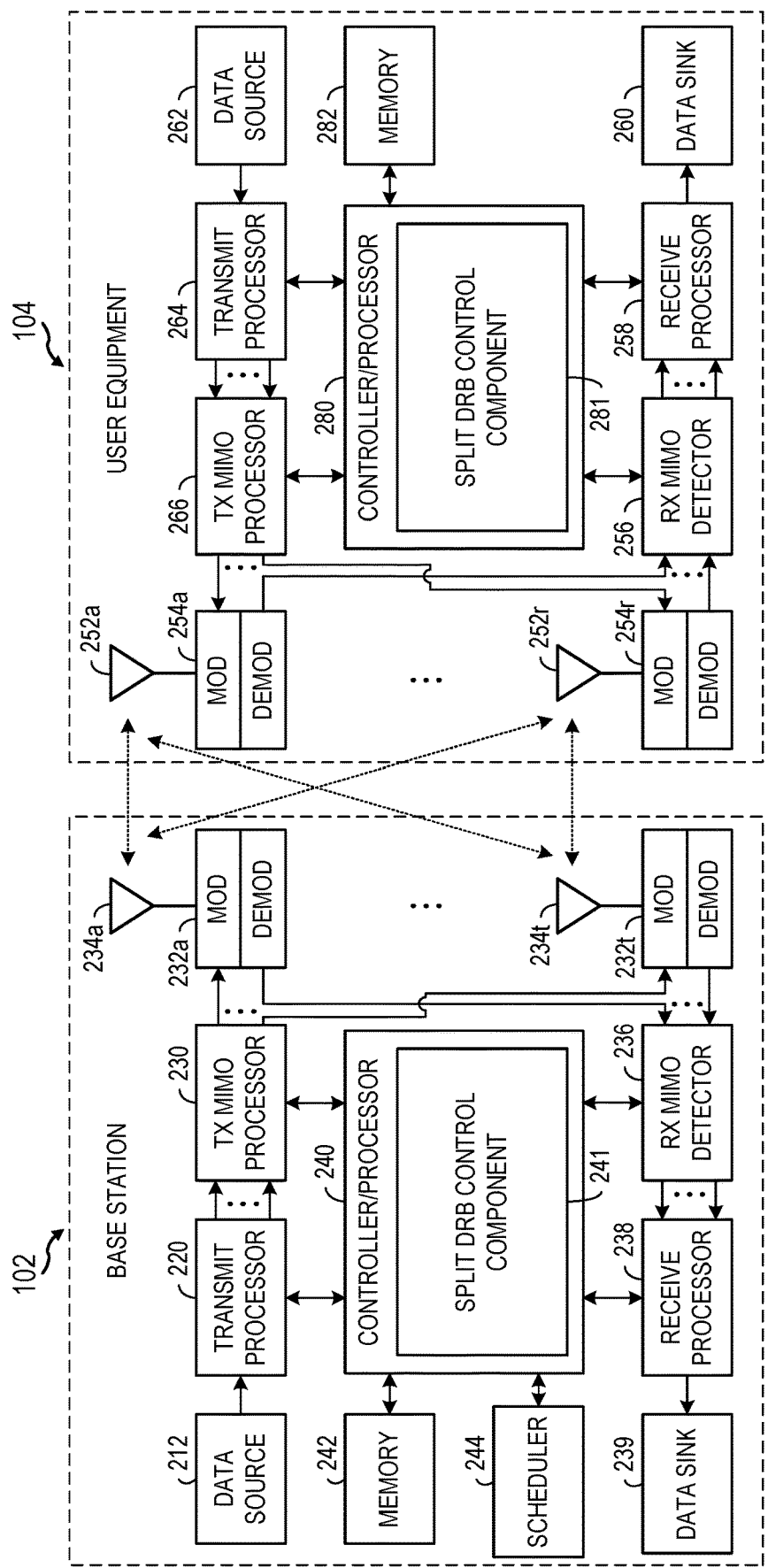
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes split DRB control component 241, which may be representative of split DRB control component 199 of FIG. 1. Notably, while depicted as an aspect of controller/processor 240, split DRB control component 241 may be implemented additionally or alternatively in various other aspects of base station 102 in other implementations. In some cases, the split DRB control component 241 may be configured to perform the operations described herein for managing SRs and utilizing split DRBs.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes split DRB control component 281, which may be representative of split DRB control component 198 of FIG. 1. Notably, while depicted as an aspect of controller/processor 280, split DRB control component 281 may be implemented additionally or alternatively in various other aspects of user equipment 104 in other implementations. In some cases, the split DRB control component 281 may be configured to perform the operations in one or more of FIG. 8 or FIG. 9, as well as other operations described herein for adjusting a split data threshold for utilizing split DRBs.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Split Data Threshold Adjustment and Split DRB Management

Figure 3:
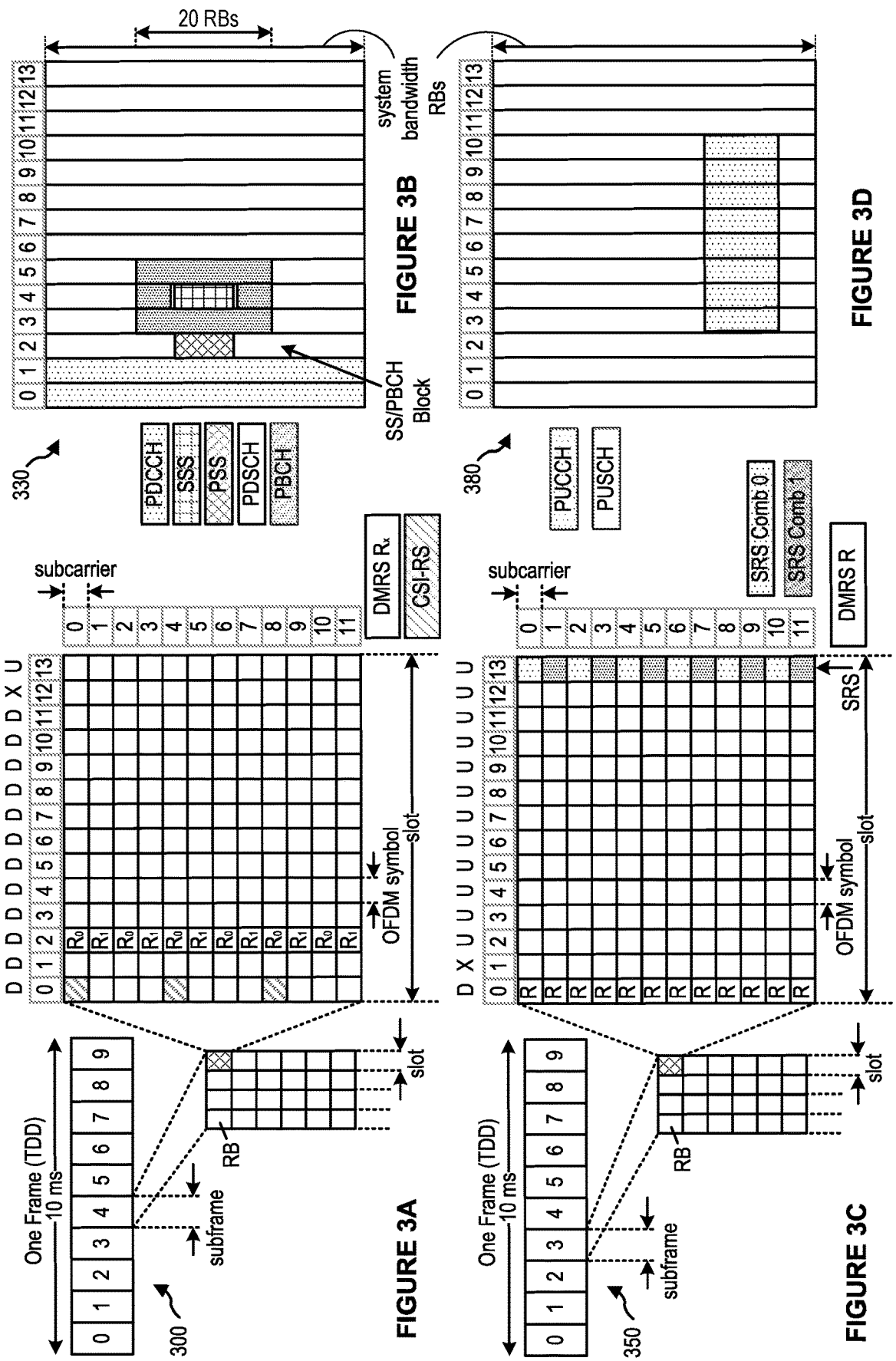
FIGS. 3A-3D depict various example aspects of data structures for a wireless communication network.
Figure 4:
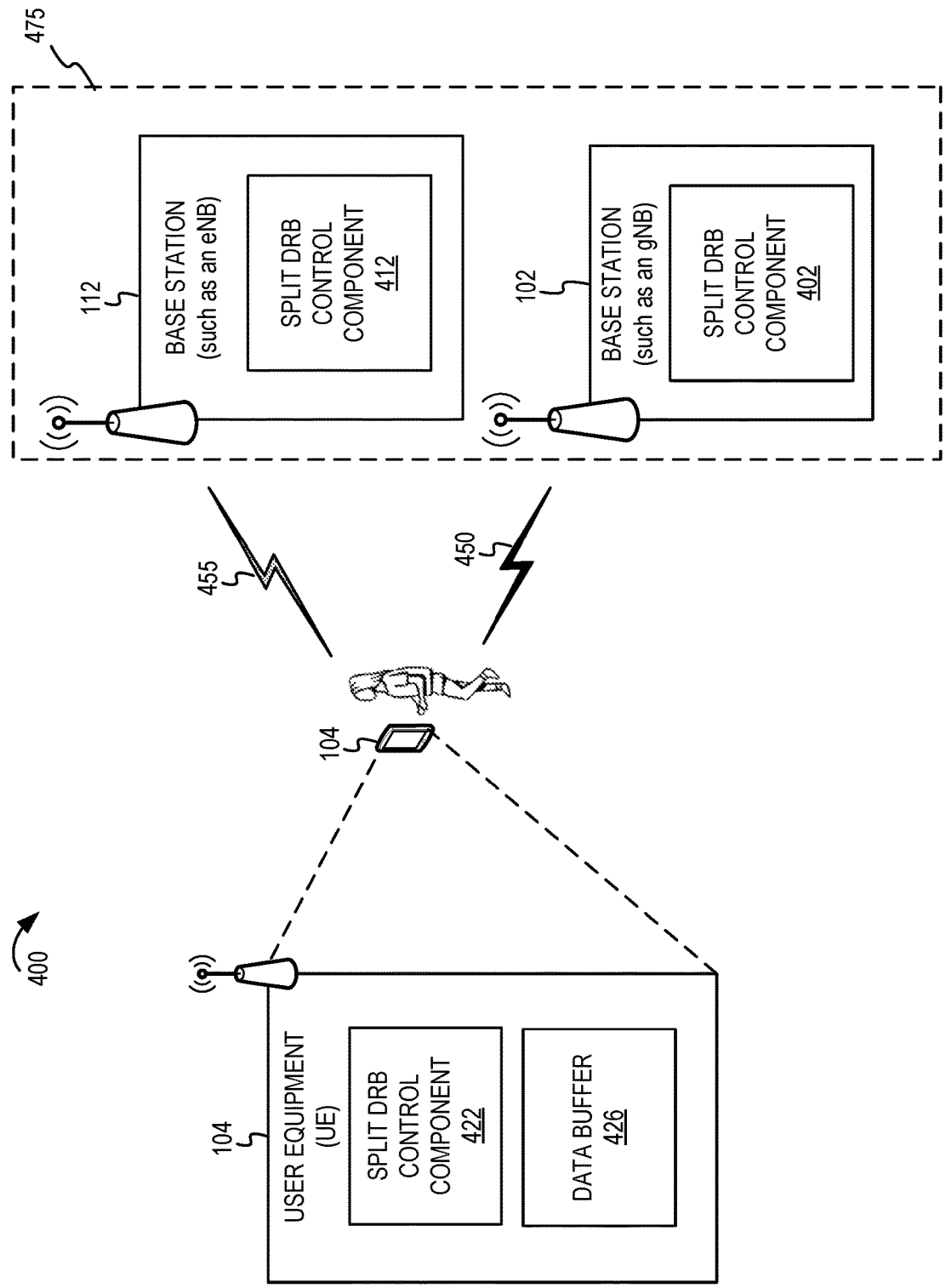
FIG. 4 depicts a system diagram of an example wireless communication network including a UE that is configured to adjust a split data threshold for utilizing a split data radio bearer (DRB).

FIG. 4 depicts a system diagram of an example wireless communication network including a UE that is configured to adjust a split data threshold for utilizing a split DRB. The wireless communication network 300 shown in FIG. 3 is based on the example wireless communication network 100 described in FIG. 1. The wireless communication network 300 may be referred to as a wide area network (WAN) or a wireless wide area network (WWAN). The wireless communication system 300 may include a UE 104, a BS 102, and a BS 112. The BS 102 and the BS 112 may have a Multi-Radio Dual Connectivity (MR-DC) architecture 475 and may be configured to operate in an MR-DC mode. The MR-DC mode may be Evolved Universal Terrestrial Radio Access (E-UTRA) NR Dual Connectivity (EN-DC) mode (which also may be referred to as LTE-NR DC mode) or an NR-DC mode (which also may be referred to as NR-NR DC mode). As shown in FIG. 3, in some implementations, the BS 102 may be a gNB that may implement a 5G NR RAT and the BS 112 may be an eNB that may implement an LTE RAT, and the BS 102 and the BS 112 may be configured to operate in an EN-DC mode. Although not shown in FIG. 3, in some implementations, the BS 102 may be a gNB that may implement a 5G NR RAT and the BS 112 also may be a gNB that may implement a 5G NR RAT, and the BS 102 and the BS 112 may be configured to operate in an NR-DC mode. Also, in some implementations, a dual connectivity architecture also may use a wireless local area network (WLAN) link. The UE 104 may be an example implementation of the UEs shown in FIGS. 1 and 2. The BS 102 and the BS 112 may each be an example implementation of the BSs shown in FIGS. 1 and 2. Although not shown for simplicity, the wireless communication system 300 may include one or more additional BSs and one or more additional UEs.

In some implementations, the UE 104 may include a split DRB control component 422 and a data buffer 426 (which may be referred to as a buffer, an UL buffer, or an UL data buffer). The split DRB control component 422 may be representative of the split DRB control component 198 of FIG. 1 and the split DRB control component 281 of FIG. 2. The split DRB control component 422 may perform operations to adjust a split data threshold and establish a split DRB and the corresponding communication links with BSs (such as BS 102 and BS 112), as further described in herein. The split DRB control component 422 may manage the transmission of SRs and the reception of grants via the communication links to establish and manage the split DRB. The data buffer 426 may be an UL data buffer and may store UL data associated with the split DRB that is transmitted to the BSs, such as the BS 102 and the BS 112. A split DRB may be a single DRB that may be split between two UL communication links at the Radio Link Control (RLC) and the Media Access Control (MAC) layers. The UL communication links may be referred to as the primary communication link and the secondary communication link.

In some implementations, the BS 102 may include a split DRB control component 402, and the BS 112 may include a split DRB control component 412. The split DRB control components 402 and 412 may be representative of the split DRB control component 199 of FIG. 1 and the split DRB control component 241 of FIG. 2. The split DRB control components 402 and 412 may perform operations to establish or configure a split DRB (such as using RRC) and the corresponding communication links with a UE (such as the UE 104) of the wireless communication network 300, and may manage the split DRB and the corresponding communication links. The split DRB control components 402 and 412 also may allocate UL resources and provide grants to the UE 104 in response to receiving SRs from the UE 104, as further described herein.

When operating in as an EN-DC mode (as shown in FIG. 1), the UE 104 may establish a wireless connection (which may be referred to as a 5G NR communication link 450) with the BS 102, and may establish a wireless connection (which may be referred to as an LTE communication link 455) with the BS 112. In some implementations, the 5G NR communication link 450 associated with the BS 102 may be the primary communication link and the LTE communication link 455 associated with the BS 112 may be the secondary communication link. In some implementations, the LTE communication link 455 associated with the BS 112 may be the primary communication link and the 5G NR communication link 450 associated with the BS 102 may be the secondary communication link. In some implementations, when the UE 104 is operating in an NR-DC mode (not shown), one of the 5G NR communication links may be the primary communication link and the other 5G NR communication link may be the secondary communication link. When the UE 104 operates in an MR-DC mode (such as the EN-DC mode or the NR-DC mode described above), the UE 104 may determine whether to utilize a split DRB to transmit data on both communication links based on the amount of data in a data buffer, such as the data buffer 426 shown in FIG. 4. The split DRB may use both the primary communication link and the secondary communication link to transmit the data in the data buffer 426.

In some implementations, the UE 104 may monitor the amount of data in the data buffer 426 to determine whether to utilize the secondary communication link in an established split DRB and request UL resources from both the BS 102 and the BS 112 via the primary and secondary communication links. For example, the UE 104 may determine whether the amount of data in the data buffer 426 is greater than a split data threshold value, such as a network-configured split data threshold value or a device configured split data threshold value, as further described herein. The data buffer 426 may receive the data from an embedded application processor, a modem, a host or other component of the UE 104. In some implementations, when the amount of data in the data buffer 426 is greater than the split data threshold value, the UE 104 may trigger an SR (which may be referred to as a PUCCH-SR) in both the primary and secondary communication links. For example, the UE 104 may trigger an SR in both the primary and secondary communication links and then request UL resources from both the BS 102 via the primary communication link and from the BS 112 via the secondary communication link. After an SR is triggered in both the primary and secondary communication links, the UE 104 may wait for a UL resource in each of the communication links in order to transmit the SR using a PUCCH via each of the communication links.

A split data threshold may be a network-configured split data threshold that is configured by the network. For example, the BS 102 may use an RRC to configure the network-configured split data threshold for the UEs in the network, such as the UE 104. The network-configured split data threshold may be referred to as an UL split data threshold or ulDataSplitThreshold. The data buffer 426 may be associated with a buffer size, a low buffer threshold (which also may be referred to as a low buffer level), and a high buffer threshold (which also may be referred to as a high buffer level). In some implementations, a host of the UE 104 may store most of the data (such as the UL data) and may provide some of the data to the data buffer 426 of the modem for transmission based on a flow control mechanism that uses the low and high buffer thresholds. The low buffer threshold is a stored data threshold or level of the data buffer 426 at which a data flow from the host to the modem is enabled. For example, if the amount of data stored in the data buffer 426 falls below the low buffer threshold, the data flow from the host to the data buffer 426 of the modem is enabled. The high buffer threshold is a stored data threshold or level at which the data flow between the host and the modem is disabled. For example, if the amount of data stored in the data buffer 426 is greater than the high level threshold, the data flow from the host to the data buffer 426 of the modem is disabled. The low and high buffer thresholds may be based on a configured UL throughput, which may be the maximum throughput that a communication link can support. For example, if a communication link has a configured UL throughput of 200 Mbps, the value of the low buffer threshold (which may be referred to as the low buffer threshold value) may be 250 kB and the value of the high buffer threshold (which may be referred to as the high buffer threshold value) may be 500 kB. The low and high buffer thresholds may also be defined independently of a flow control mechanism. For example, the low and high buffer thresholds may be implemented to collect statistics or solely to enable the rest of the disclosure described herein. In some implementations, the UE 104 may use the low and high buffer threshold to determine whether to use the network-configured split data threshold or a device-configured split data threshold to utilize a split DRB. The device-configured split data threshold may be referred to as an internal UL split data threshold or ulDataSplitThresholdInternal. As further described herein, when certain conditions are met with respect to the low and high buffer thresholds, the UE 104 may configure a device-configured split date threshold and may use the device-configured split data threshold (instead of the network-configured split data threshold) to determine whether to utilize a split DRB.

In some network configurations, the network-configured split data threshold may have a relatively high value that does not consistently trigger a split DRB, and therefore the UE 104 may not obtain the performance benefits of a split DRB. The UE 104 may configure a device-configured split data threshold that has a lower value than the network-configured split data threshold and triggers a split DRB more often than the network-configured split data threshold. In some implementations, the UE 104 may compare a value of the network-configured split data threshold (which may be referred to as the network-configured split data threshold value) to the low buffer threshold value to determine whether to use the network-configured split data threshold or the device-configured split data threshold for utilizing a split DRB. The UE 104 may determine whether the network-configured split data threshold value is greater than the low buffer threshold value to determine whether to use the network-configured split data threshold or the device-configured split data threshold. If the network-configured split data threshold value is greater than the low buffer threshold value, the UE 104 may determine to use the device-configured split data threshold and may set or configure the device-configured split data threshold to a value (which may be referred to as the device-configured split data threshold value) that is less than or equal to the network-configured split data threshold value. For example, the device-configured split data threshold may be set to a value that is less than or equal to the low buffer threshold value, as further described in FIG. 5. The UE 104 may trigger a first SR associated with the primary communication link and a second SR associated with the secondary communication link to utilize a split DRB if the amount of data in the data buffer 426 is greater than the device-configured split data threshold value. In some implementations, if the network-configured split data threshold value is less than or equal to the low buffer threshold value, the UE 104 may determine to use the network-configured split data threshold value for utilizing a split DRB or may set the device-configured split data threshold value to the network-configured split data threshold value.

In some network configurations, the network-configured split data threshold may have a relatively low value that may unnecessarily utilize a split DRB and waste power. For example, if the first threshold has a relatively low value, SRs may be transmitted in both the primary and secondary communication links. By the time a second SR is transmitted in the secondary communication link and grants are received via the secondary communication link, the primary communication link may have drained the data from the data buffer 426. Therefore, the data buffer 426 may not have data to transmit via the secondary communication link, which may result in wasted UL grants and wasted power. In some implementations, when the network-configured split data threshold is a relatively low value, the UE 104 may modify the network-configured split data threshold internally and set it to a greater value. In some implementations, the UE 104 may configure or set a device-configured split data threshold to have a value greater than the network-configured split data threshold, and use the device-configured split data threshold to trigger the SRs for utilizing the split DRB. The UE 104 may set the device-configured split data threshold to a value that is greater than or equal to a first threshold associated with the data buffer 426. For example, the first threshold may be a number of bytes of a maximum transmission unit (MTU) associated with a communication link. For example, an MTU may be 1500 bytes. As one example, if the device-configured split data threshold is set to 0 bytes, the UE 104 may set the device-configured split data threshold to b6400, which corresponds to 6400 bytes. In some implementations, the UE 104 may determine a value for the device-configured split data threshold according to a MAC discontinuous reception (DRX) configuration for each of the primary and secondary communication links, and the type (WLAN, LTE, NR, etc.) of the primary and secondary communication links. In some embodiment, when the network-configured split data threshold is a relatively low value, the UE 104 may use a buffer latency associated with data in the data buffer 426 to determine whether to trigger a split DRB. In some implementations, the UE 104 may determine whether the network-configured split data threshold value is less than a first threshold associated with the data buffer 426. A value that is less than the first threshold may be considered a relatively low value for the network-configured split data threshold that may unnecessarily utilize the split DRB and waste power. For example, the first threshold may be a number of bytes of a maximum transmission unit (MTU) associated with a communication link. For example, an MTU may be 1500 bytes. The UE 104 may monitor the data in the data buffer 426 if the network-configured split data threshold value is less than the first threshold. The UE 104 may trigger a first SR associated with the primary communication link and a second SR associated with the secondary communication link based on a buffer latency realized from the monitoring of the data in the data buffer 426. The buffer latency may be an average time that packets wait in the data buffer when only the primary communication link is draining the data buffer. In some implementations, the UE 104 may trigger the first SR associated with the primary communication link and the second SR associated with the secondary communication link based on the buffer latency associated with the data in the data buffer 426, packet buffer latency, and a latency threshold, as further described in FIG. 6.

Figure 5:
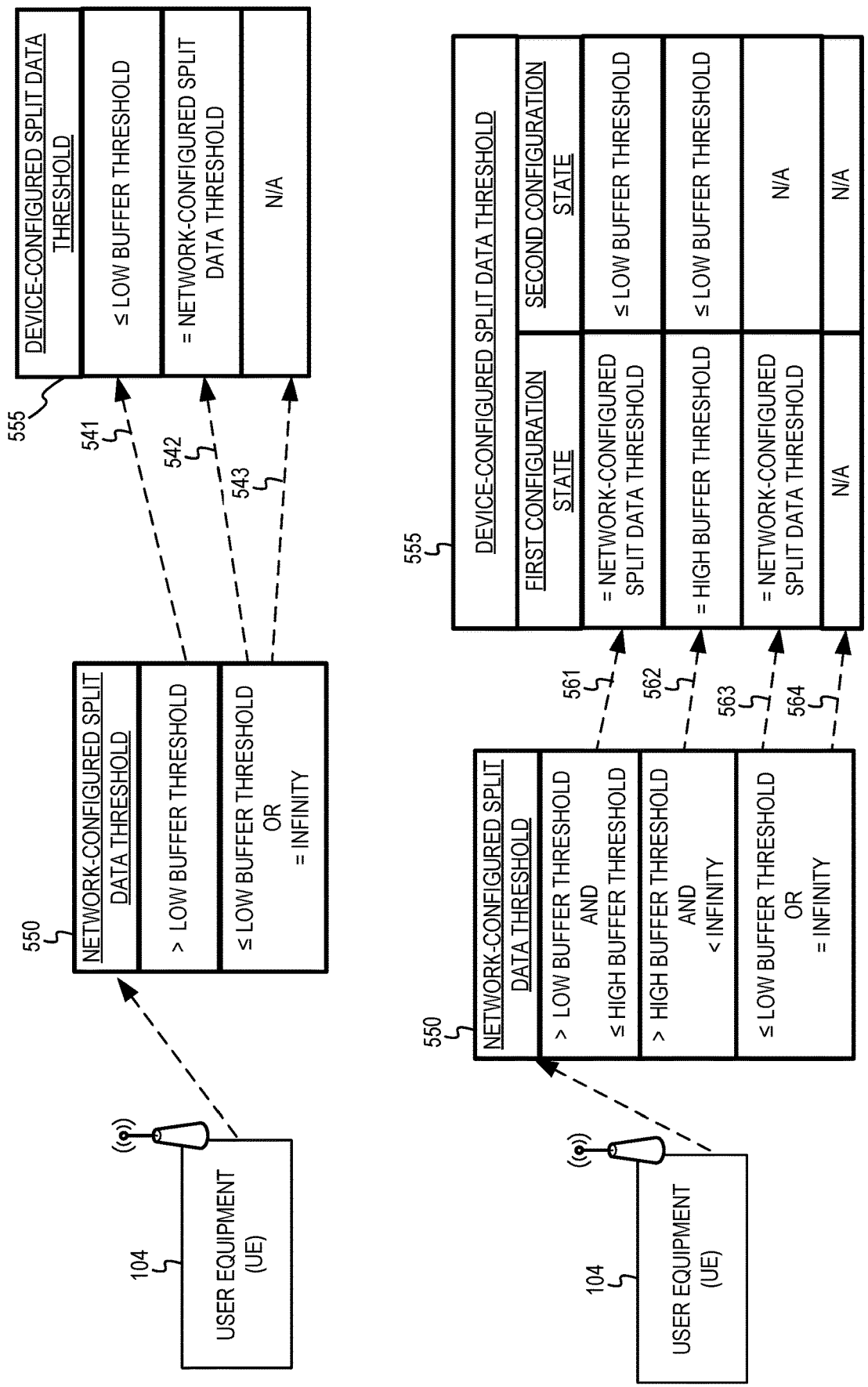
FIG. 5 depicts a conceptual diagram of a configuration process performed by a UE to configure a device-configured split data threshold for use in a split DRB.

FIG. 5 depicts a conceptual diagram 500 of a configuration process performed by a UE to configure a device-configured split data threshold for use in a split DRB. FIG. 5 includes a node or network entity of a wireless communication network, such as the UE 104 that is described in FIG. 4.

The UE 104 may identify a network-configured split data threshold 550 stored at the UE 104. For example, the UE 104 may receive the network-configured split data threshold 550 from a BS (such as the BS 102 described in FIG. 4) via an RRC. In some implementations, the UE 104 may determine that the network-configured split data threshold value (which may be referred to as ulDataSplitThreshold) is greater than the low buffer threshold value (which may be referred to as Low). For example, this determination may be represented as ulDataSplitThreshold>Low. As shown by arrow 541, if the network-configured split data threshold value is greater than the low buffer threshold value, the UE 104 may set or configure the device-configured split data threshold 555 (which may be referred to as ulDataSplitThresholdInternal) to a value that is less than or equal to the low buffer threshold value. For example, this configuration may be represented as ulDataSplitThresholdInternal≤Low. The UE 104 may monitor the amount of data in a data buffer (such as the data buffer 426 described in FIG. 4). If the device-configured split data threshold value is set to the low buffer threshold value, the UE 104 may determine whether the amount of data in the data buffer is greater than the low buffer threshold value. If so, the UE 104 may trigger the SRs in the primary and secondary communications links to utilize the split DRB and start splitting the transmission of the data via both the primary and secondary communication links. The UE 104 may continue splitting the data transmissions until the amount of data in the data buffer is less than the low buffer threshold value. When the amount of data in the data buffer is less than the low buffer threshold value, the UE 104 may stop splitting the data transmissions.

In some implementations, the UE 104 may use a value that equals the low buffer threshold value minus an offset amount X. This may be represented as Low−X. The offset amount X may equal to a fraction (x_frac) of the low buffer threshold value, and may be represented as X=x_frac*Low. The offset amount X may add hysteresis in case the amount of data in the data buffer briefly goes below the low buffer threshold before additional data arrives at the data buffer. In some implementations, the UE 104 may determine that the network-configured split data threshold value is greater than Low−X. If the network-configured split data threshold value is greater than Low−X, the UE 104 may set or configure the device-configured split data threshold 555 to a value that is less than or equal to Low−X.

In some implementations, the UE 104 may determine that the network-configured split data threshold value is less than or equal to the low buffer threshold value. For example, this determination may be represented as ulDataSplitThreshold≤Low. In some implementations, as shown by arrow 542, if the network-configured split data threshold value is less than or equal to the low buffer threshold value, the UE 104 may set or configure the device-configured split data threshold 555 to a value that is equal to the network-configured split data threshold value. For example, this configuration may be represented as ulDataSplitThresholdInternal=ulDataSplitThreshold. In some implementations, as shown by arrow 543, if the network-configured split data threshold value is less than or equal to the low buffer threshold value, the UE 104 may determine to use the network-configured split data threshold value for utilizing a split DRB, instead of configuring the device-configured split data threshold. In some implementations, instead of using the low buffer threshold for the comparison operation, the UE 104 may use Low−X, as described above.

In some implementations, the UE 104 may determine that the network-configured split data threshold value is infinity. For example, this determination may be represented as ulDataSplitThreshold=Infinity. In one example, the network-configured split data threshold value being equal to infinity may refer to the network-configured split data threshold value being a value that is much greater than the high buffer threshold value. For example, the network-configured split data threshold value may be a value that is greater than the high buffer threshold value by an offset amount. As another example, the network-configured split data threshold value being equal to infinity may refer to the network-configured split data threshold value being greater than the high buffer threshold value. In some implementations, as shown by arrow 542, if the network-configured split data threshold value is infinity, the UE 104 may set or configure the device-configured split data threshold value to a value that is equal to the network-configured split data threshold value. For example, this configuration may be represented as ulDataSplitThresholdInternal=ulDataSplitThreshold. In some implementations, as shown by arrow 543, if the network-configured split data threshold value is infinity, the UE 104 may determine to use the network-configured split data threshold value for utilizing a split DRB, instead of configuring the device-configured split data threshold.

In some implementations, the UE 104 may optimize the split data threshold adjustment process described above by implementing a two state configuration process that adds additional hysteresis to the split data threshold adjustment process. In some implementations, the UE 104 may determine that the value of the network-configured split data threshold 550 is greater than the low buffer threshold value and less than or equal to the high buffer threshold value (which may be referred to as High). For example, this determination may be represented as Low<ulDataSplitThreshold≤High. As shown by arrow 561, if the network-configured split data threshold value is greater than the low buffer threshold value and less than the high buffer threshold value, the UE 104 may set or configure the value of the device-configured split data threshold 555 to the network-configured split data threshold value for the first configuration state. For example, the first configuration state may be represented as ulDataSplitThresholdInternal=ulDataSplitThreshold. The UE 104 may use the first configuration state to initiate the split DRB and start splitting the transmission of the data via both the primary communication link and the secondary communication link. After the UE 104 initiates the split DRB, the UE 104 may set or configure the device-configured split data threshold value to a value that is less than or equal to the low buffer threshold value for the second configuration state. For example, the second configuration state may be represented as ulDataSplitThresholdInternal≤Low. The second configuration state may result in the UE 104 continuing to split the data transmissions via both the primary and secondary links. If the device-configured split data threshold value is set to the low buffer threshold value, the UE 104 may continue splitting the data transmissions until the amount of data in the data buffer is less than the low buffer threshold value. When the amount of data in the data buffer is less than the low buffer threshold value, the UE 104 may stop splitting the data transmissions and may revert to the first configuration state. In some implementations, instead of using the low buffer threshold (Low) for the configuration operation, the UE 104 may use Low−X, as described above. For example, the second configuration state may be represented as ulDataSplitThresholdInternal=Low−X.

In some implementations, the UE 104 may determine that the network-configured split data threshold value is greater than the high buffer threshold value and less than infinity. For example, this determination may be represented as High<ulDataSplitThreshold<Infinity. As shown by arrow 562, if the network-configured split data threshold value is greater than the high buffer threshold value and less than infinity, the UE 104 may set or configure the device-configured split data threshold value to the high buffer threshold value for the first configuration state. For example, the first configuration state may be represented as ulDataSplitThresholdInternal=High. The UE 104 may use the first configuration state to initiate the split DRB. After the UE 104 initiates the split DRB, the UE 104 may set or configure the device-configured split data threshold value to a value that is less than or equal to the low buffer threshold value for the second configuration state. For example, the second configuration state may be represented as ulDataSplitThresholdInternal≤Low. The second configuration state may result in the UE 104 continuing to split the data transmissions via both the primary and secondary links. In some implementations, instead of using the low buffer threshold (Low) for the configuration operation, the UE 104 may use Low−X, as described above. For example, the second configuration state may be represented as ulDataSplitThresholdInternal=Low−X.

In some implementations, the UE 104 may determine that the network-configured split data threshold value is less than or equal to the low buffer threshold value or the network-configured split data threshold value is equal to infinity. For example, this determination may be represented as ulDataSplitThreshold≤Low or ulDataSplitThreshold=Infinity. In some implementations, the configuration process shown by arrow 563 may be the same as the configuration process described above with reference to the arrow 542. Also, the configuration process shown by arrow 564 may be the same as the configuration process described above with reference to the arrow 543. When the network-configured split data threshold value is less than or equal to the low buffer threshold value or the network-configured split data threshold value is equal to infinity, the configuration process may not include a second configuration state.

Figure 6:
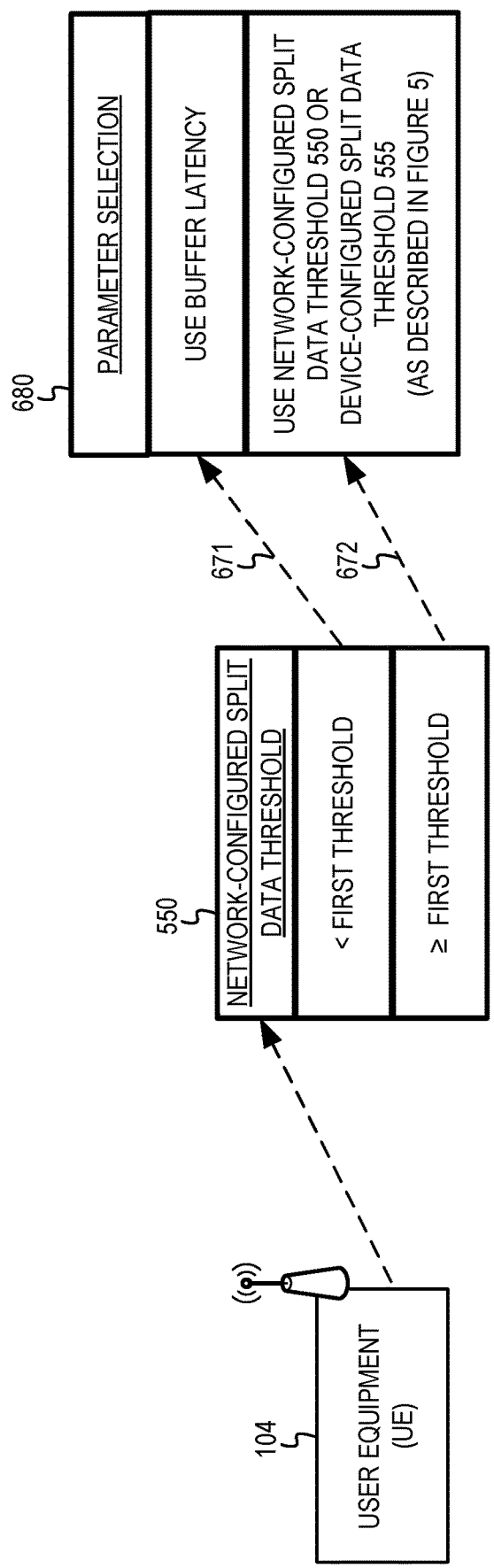
FIG. 6 depicts a conceptual diagram of a configuration process performed by a UE that uses a buffer latency to determine whether to utilize a split DRB.

FIG. 6 depicts a conceptual diagram 600 of a configuration process performed by a UE that uses a buffer latency to determine whether to utilize a split DRB. FIG. 6 includes a node or network entity of a wireless communication network, such as the UE 104 that is described in FIG. 4.

The UE 104 may identify a network-configured split data threshold 550 stored at the UE 104. For example, the UE 104 may receive the network-configured split data threshold 550 from a BS (such as the BS 102 described in FIG. 4) via an RRC. In some implementations, the UE 104 may determine whether a value of the network-configured split data threshold 550 is less than a first threshold. The UE 104 may select which parameters to use for a split DRB based on whether the network-configured split data threshold value is less than the first threshold, as shown in parameter selection 680 and further described below. The first threshold may be a relatively low value that may unnecessarily utilize a split DRB and waste power. For example, if the first threshold has a relatively low value, SRs may be transmitted in both the primary and secondary communication links. By the time a second SR is transmitted in the secondary communication link and grants are received via the secondary communication link, the primary communication link may have drained the data from the data buffer. Therefore, the data buffer may not have data to transmit via the secondary communication link, which may result in wasted UL grants and wasted power. In some implementations, the first threshold may be a number of bytes of a maximum transmission unit (MTU) associated with a communication link. For example, an MTU may be 1500 bytes.

In some implementations, as shown by arrow 671, if the network-configured split data threshold is less than the first threshold, the UE 104 may use the buffer latency for utilizing a split DRB. In some implementations, if the network-configured split data threshold is less than the first threshold, the UE 104 may monitor the amount of data in the data buffer (such as the data buffer 426 described in FIG. 4). The UE 104 may trigger a first SR associated with the primary communication link and a second SR associated with the secondary communication link based on the buffer latency associated with the data in the data buffer. The buffer latency may be an average time that packets wait in the data buffer when only the primary communication link is draining the data buffer. The buffer latency also may be referred to as the primary latency or primary latency. The buffer latency may be configurable and may be estimated based on real-time measurements or based on a semi-static measurement, as further described below. For example, the buffer latency may be 40 ms, 50 ms, or 60 ms, among other values. In some implementations, the UE 104 may use the buffer latency (which also may be referred to as an average buffer latency) and a packet buffer latency to determine whether to trigger the SRs and utilize a split DRB. The packet buffer latency may be an amount of time that data associated with a packet has been buffered in the data buffer. For example, the packet buffer latency at a time t may be t minus an arrival time of the data at the data buffer. The UE 104 may trigger the first SR associated with the primary communication link and the second SR associated with the secondary communication link in response to the packet buffer latency being greater than the buffer latency. In some implementations, in addition to the buffer latency and the packet buffer latency, the UE 104 may use a latency threshold to determine whether to establish a split DRB. The UE 104 may trigger the first SR associated with the primary communication link and the second SR associated with the secondary communication link for utilizing a split DRB based on the buffer latency, the packet buffer latency, and the latency threshold. For example, the UE 104 may trigger the first SR associated with the primary communication link and the second SR associated with the secondary communication link in response to the packet buffer latency being greater than a minimum of the buffer latency and the latency threshold. This condition may be represented as packet buffer latency>min (buffer latency, latency threshold). In one example, the latency threshold may be a constant latency threshold, such as 50 ms. Even if the buffer latency that is measured by the UE 104 is greater the latency threshold, the latency threshold may ensure that the SRs are triggered if the packet buffer latency is greater than the latency threshold. In this example, the condition may be represented as packet buffer latency>min (buffer latency, 50 ms). In some implementations, the buffer latency may be an average time that packets wait in the data buffer when only the primary communication link or only the secondary communication link is draining the data buffer. For example, the UE 104 may select from the primary or secondary communication links based on the link having the minimum link latency. As another example, the UE 104 may select from the primary or secondary communication links based on the link that the UE 104 is currently using for DL transmissions.

In some implementations, as shown by arrow 672, if the network-configured split data threshold is greater than or equal to the first threshold, the UE 104 may use the network-configured split data threshold 550 or the device-configured split data threshold 555 to determine whether to utilize a split DRB, as described in FIG. 5.

In some implementations, the buffer latency may be estimated based on real-time measurements or based on a semi-static measurement or value associated with an RRC configuration of the primary communication link. In some implementations, the real-time measurements may include the UE 104 measuring an average time that it takes for UL packets that arrive in the packet data convergence protocol (PDCP) to be included in the transport block (TB). In some implementations, the semi-static measurement may include the UE 104 determining the buffer latency based on a rude wake-up time, an SR delay, a network scheduling delay, and a downlink control information (DCI) data delay. The semi-static measurement may be represented as buffer latency=rude wake-up time+SR delay+network scheduling delay+DCI data delay. The rude wake-up time may be the time for a modem of the UE 104 to wake up after packet arrival if the packet arrives while the UE 104 is in a sleep mode. The rude wake-up time may be based on the UE sleep mode and therefore may be dependent on the UE's discontinuous reception (DRX) configuration and cycle length. The SR delay may include the delay to send UL SRs. For example, the delay to send UL SRs may be the amount of time it typically takes to send UL SRs and may be based on the SR configuration and periodicity, such as the SR periodicity divided by 2. The network scheduling delay may include an estimate of the delay to receive a UL grant from a BS of the wireless communication network. For example, the network scheduling delay may be an estimate of the amount of time it typically takes to receive a UL grant from a BS. The DCI data delay may include a delay to send the TB or the amount of time it typically takes to send the TB. For example, the DCI data delay may be based on a value that determines the delay from receiving a PDCCH with a UL grant to sending a UL PUSCH.

In some implementations, the UE 104 may select one of the communication links associated with the split DRB as the primary communication link based on a link latency. The link latency may be similar to the buffer latency associated with the primary link that is described herein and may be measured in a similar manner based on a rude wake-up time, SR delay, network scheduling delay, and DCI data delay. For example, the semi-static measurement may be represented as link latency=rude wake-up time+SR delay+network scheduling delay+DCI data delay. In some implementations, the UE 104 may select the communication link with the minimum link latency as the primary communication link. For example, if a first communication link (such as a 5G NR communication link) associated with the split DRB has a lower link latency than a second communication link (such as an LTE communication link), the UE 104 may select the first communication link as the primary communication link. In some implementations, in order to optimize power, the UE 104 may select the communication link in which data traffic is currently being received by the UE 104 as the primary communication link, or the UE 104 may select the communication link that is in an active state (or high power state) as per its DRX configuration as the primary communication link. For example, if the UE 104 is currently receiving or obtaining DL data in the first communication link, the UE 104 may select the first communication link as the primary communication link. As another example, if the second communication link has an enabled DRX configuration or the second communication link is in an active (or high power) state as per its DRX configuration, the UE 104 may select the second communication link as the primary communication link.

In some implementations, the device-configured split data threshold value may be determined based on the buffer latency, a primary link rate, or both the buffer latency and the primary link rate. For example, the device-configured split data threshold value may be an amount of data that can be drained from the data buffer in an amount of time corresponding to the buffer latency at a primary link rate. For example, the device-configured split data threshold value may be an amount of data that can be drained from the data buffer in an amount of time corresponding to the buffer latency multiplied by the primary link rate. The primary link rate may be the UL throughput of the primary communication link. For example, the primary link rate may be a percentage (such as 10%) of the configured UL throughput of the primary communication link. As another example, the primary link rate may be based on an estimated throughput of the primary communication link. In some implementations, the device-configured split data threshold value may be an amount of data that can be drained from the data buffer in an amount of time corresponding to the minimum of the buffer latency and a latency threshold and at a primary link rate. For example, the device-configured split data threshold value may be an amount of data that can be drained from the data buffer in an amount of time corresponding to the minimum of the buffer latency and a latency threshold and at a primary link rate and multiplied by the primary link rate.

Example Call Flow Illustrating Operations for Utilizing a Split DRB

Figure 7:
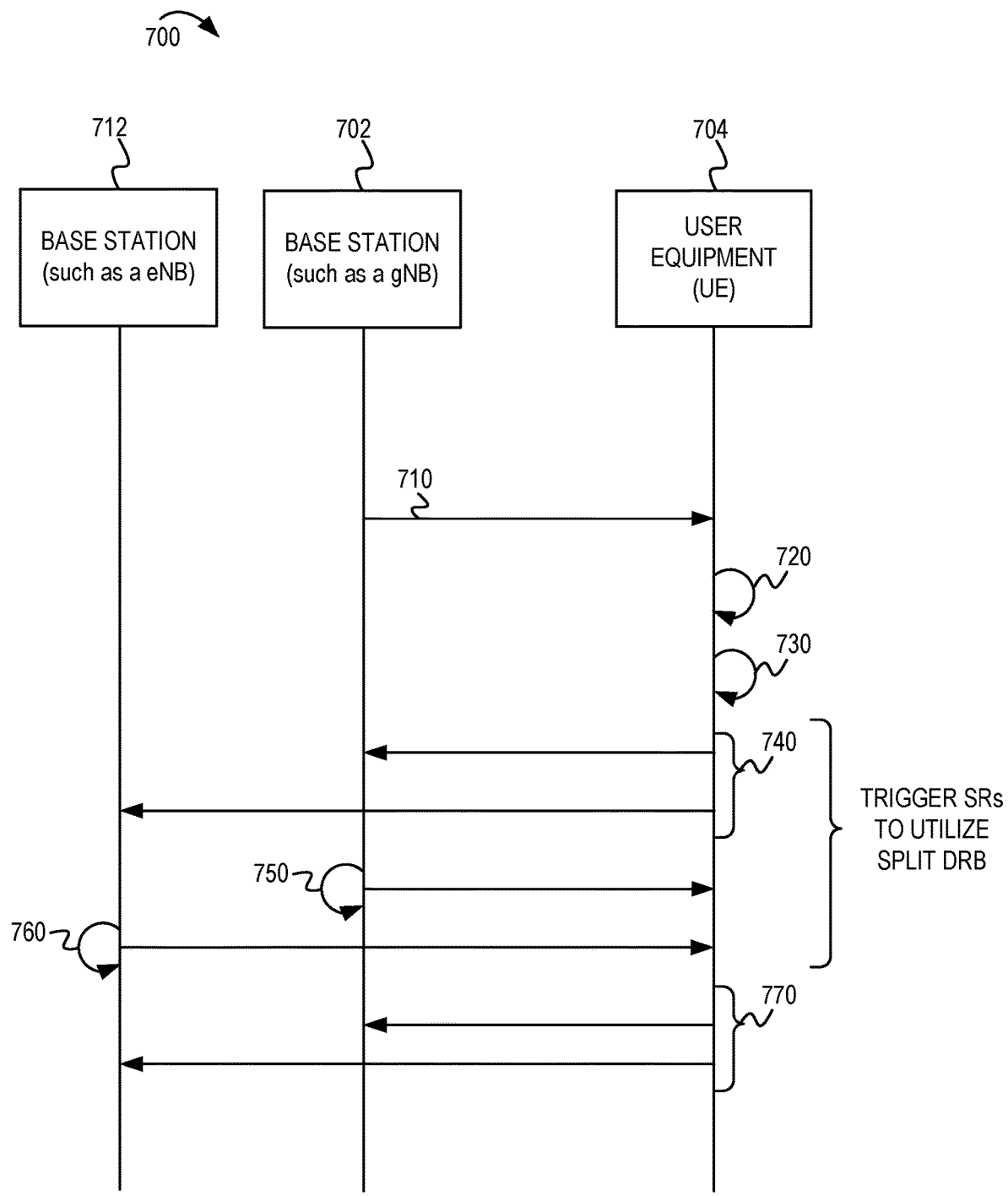
FIG. 7 is a call flow diagram illustrating example operations for communication between a UE, a first BS, and a second BS for utilizing a split DRB.

FIG. 7 is a call flow diagram illustrating example operations 700 for communication between a UE 704, a BS 702, and a BS 712 for utilizing a split DRB. In some cases, the UE 704 may be representative of the UEs shown in FIGS. 1-2 and FIGS. 4-6, and the BSs 702 and 712 may be representative of the BSs shown in FIGS. 1-2 and FIGS. 4-6.

As shown, the operations 700 illustrated in FIG. 7 begin at 710 with the BS 702 configuring a network-configured split data threshold at the UE 704 via an RRC.

At 720, the UE 704 may adjust parameters and criteria for triggering SRs in order to utilize a split DRB. For example, instead of using a network-configured split data threshold, the UE 704 may determine to use a device-configured split data threshold for triggering SRs, as described in FIG. 5. As another example, the UE 704 may determine to use a buffer latency for triggering SRs, as described in FIG. 6.

At 730, the UE 704 may trigger the SRs for utilizing the split DRB. For example, the UE 704 may determine to trigger the SRs in response to determining the amount of data in the data buffer is greater than the device-configured split data threshold, as described in FIG. 5. As another example, the UE 704 may determine to trigger the SRs in response to determining the packet buffer latency associated with the data in the data buffer is greater than the buffer latency associated with the data buffer, as described in FIG. 6.

At 740, the UE 704 may transmit a first SR to the BS 702 via a primary communication link and a second SR to the BS 712 via a secondary communication link for utilizing a split DRB.

At 750, the BS 702 may process the first SR received via the primary communication link and may transmit a grant to the UE 704 via the primary communication link.

At 760, the BS 712 may process the second SR received via the secondary communication link and may transmit a grant to the UE 704 via the secondary communication link.

At 770, the BS 702 may begin transmitting data from the data buffer via both the primary communication link and the secondary communication link based on the received grants.

Example Flow Diagrams Illustrating Operations for Utilizing a Split DRB

Figure 8:
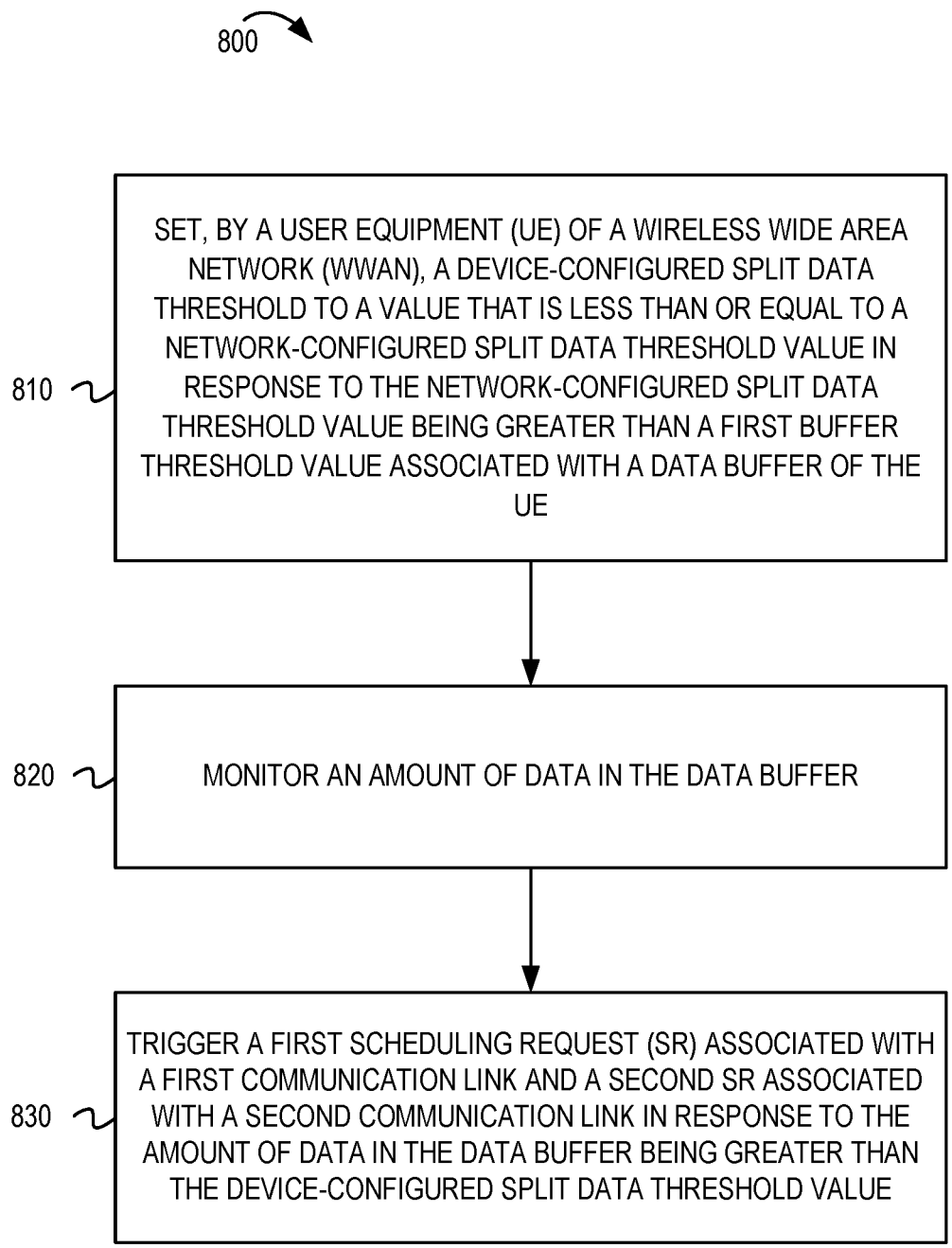
FIG. 8 is a flow diagram illustrating example operations for wireless communication at a user equipment.

FIG. 8 is a flow diagram illustrating example operations 800 for wireless communication. The operations 800 may be performed, for example, by a UE (e.g., such as the UE 104 in the wireless communication network 100 of FIG. 1) for configuring a device-configured split data threshold for utilizing a split DRB. The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the split DRB control component 281) obtaining and/or outputting signals.

The operations 800 may begin, at 810, with the UE setting a device-configured split data threshold to a value that is less than or equal to a network-configured split data threshold value in response to the network-configured split data threshold value being greater than a first buffer threshold value associated with a data buffer of the UE. At 820, the UE may monitor an amount of data in the data buffer. At 830, the UE may trigger a first SR associated with a first communication link and a second SR associated with a second communication link in response to the amount of data in the data buffer being greater than the device-configured split data threshold value.

Figure 9:
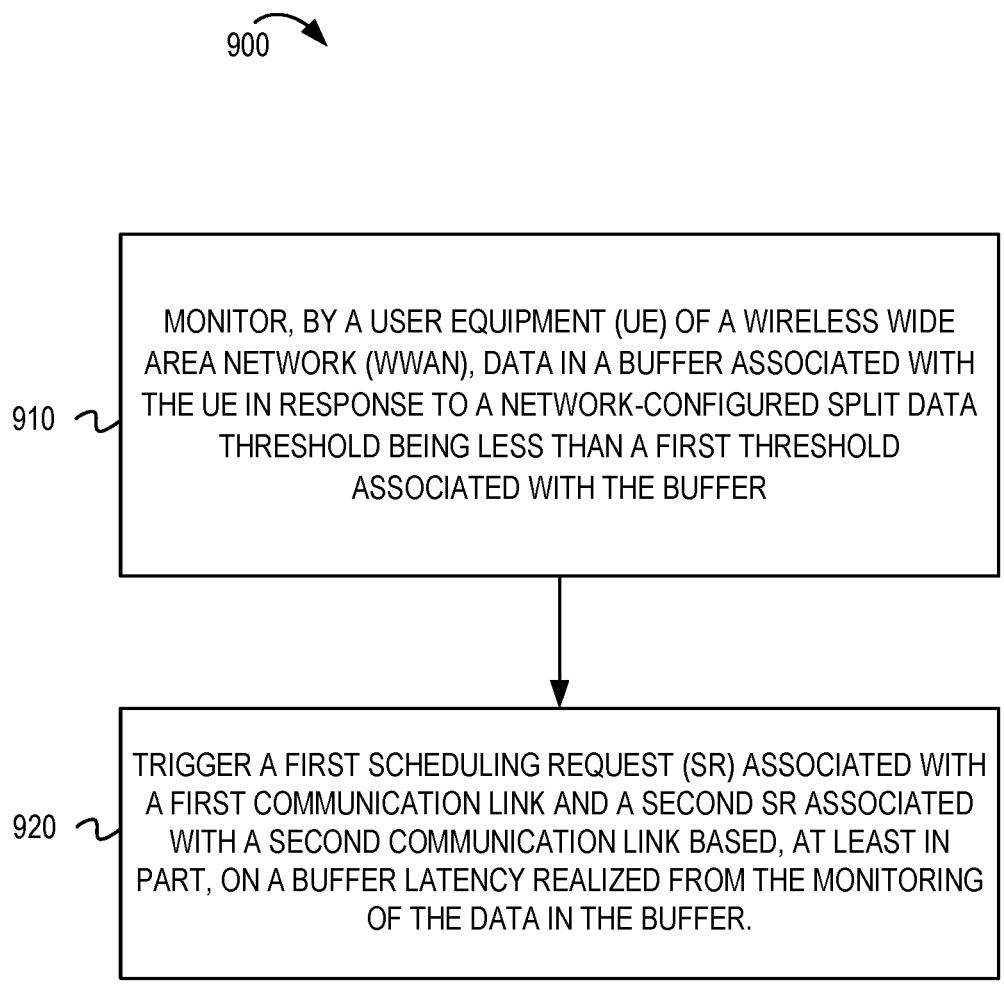
FIG. 9 is a flow diagram illustrating example operations for wireless communication at a user equipment.

FIG. 9 is a flow diagram illustrating example operations 900 for wireless communication. The operations 900 may be performed, for example, by a UE (e.g., such as the UE 104 in the wireless communication network 100 of FIG. 1) for using a buffer latency associated with a data buffer for utilizing a split DRB. The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the split DRB control component 281) obtaining and/or outputting signals.

The operations 900 may begin, at 910, with the UE monitoring data in a buffer associated with the UE in response to a network-configured split data threshold being less than a first threshold associated with the buffer. At 920, the UE may trigger a first SR associated with a first communication link and a second SR associated with a second communication link based, at least in part, on a buffer latency realized from the monitoring of the data in the buffer.

Example Wireless Communication Devices

Figure 10:
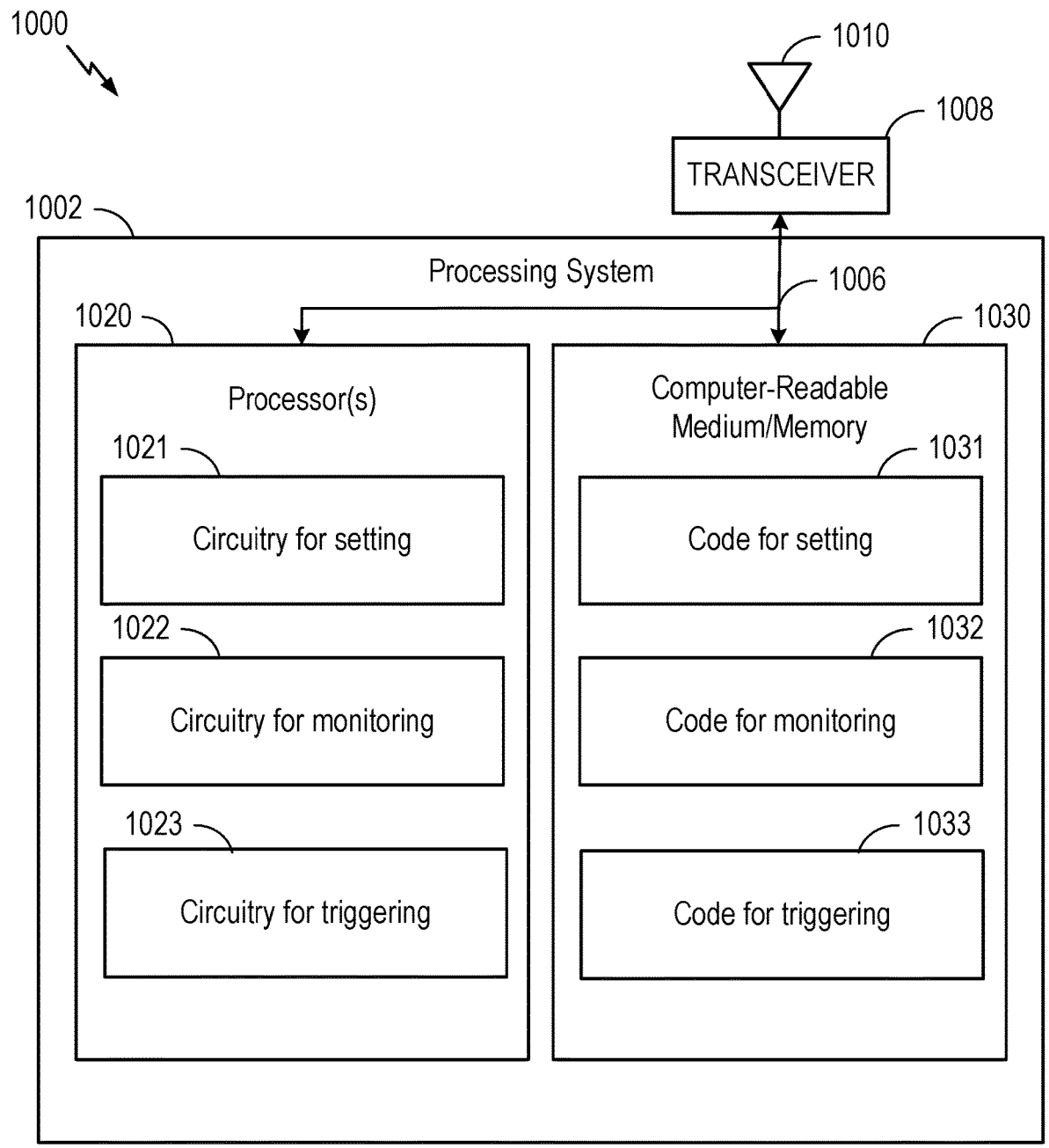
FIGS. 10 and 11 depict aspects of example communications devices.

FIG. 10 depicts an example communications device 1000 that includes various components operable, configured, or adapted to perform operations for the techniques disclosed herein, such as the operations depicted and described with respect to FIGS. 8 and 9 and additional operations described with respect to FIGS. 4-7. In some examples, communication device 1000 may be a UE 104 as described, for example with respect to FIGS. 1 and 2.

Communications device 1000 includes a processing system 1002 coupled to a transceiver 1008 (e.g., a transmitter and/or a receiver). A processing system includes a memory with instructions and at least one processor configured to execute the instructions. Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations described with respect to FIGS. 8 and 9, or other operations for performing the various techniques discussed in FIGS. 4-9 for adjusting a split data threshold for utilizing a split DRB.

In the depicted example, computer-readable medium/memory 1030 stores code 1031 for setting, code 1032 for monitoring, and code 1033 for triggering.

In the depicted example, the one or more processors 1020 include circuitry configured to implement the code stored in the computer-readable medium/memory 1030, including circuitry 1021 for setting, circuitry 1022 for monitoring, and circuitry 1023 for triggering.

Various components of communications device 1000 may provide means for performing the methods described herein, including with respect to FIGS. 4-9.

In some examples, means for transmitting or sending (or means for outputting for transmission) may include the transceivers 254 and/or antenna(s) 252 of the user equipment 104 illustrated in FIG. 2 and/or transceiver 1008 and antenna 1010 of the communication device 1000 in FIG. 10.

In some examples, means for receiving (or means for obtaining) may include the transceivers 254 and/or antenna(s) 252 of the user equipment 104 illustrated in FIG. 2 and/or transceiver 1008 and antenna 1010 of the communication device 1000 in FIG. 10.

In some example, means for setting may include a bus interface, such as the bus 1006, and/or circuitry for setting 1021, and/or code for setting 1031, and/or split DRB control component 281. In some example, means for monitoring may include a bus interface, such as the bus 1006, and/or circuitry for monitoring 1022, and/or code for monitoring 1032, and/or split DRB control component 281. In some example, means for triggering may include a bus interface, such as the bus 1006, and/or circuitry for triggering 1023, and/or code for triggering 1033, and/or split DRB control component 281.

Notably, FIG. 10 is just one example, and many other examples and configurations of communication device 1000 are possible.

Figure 11:
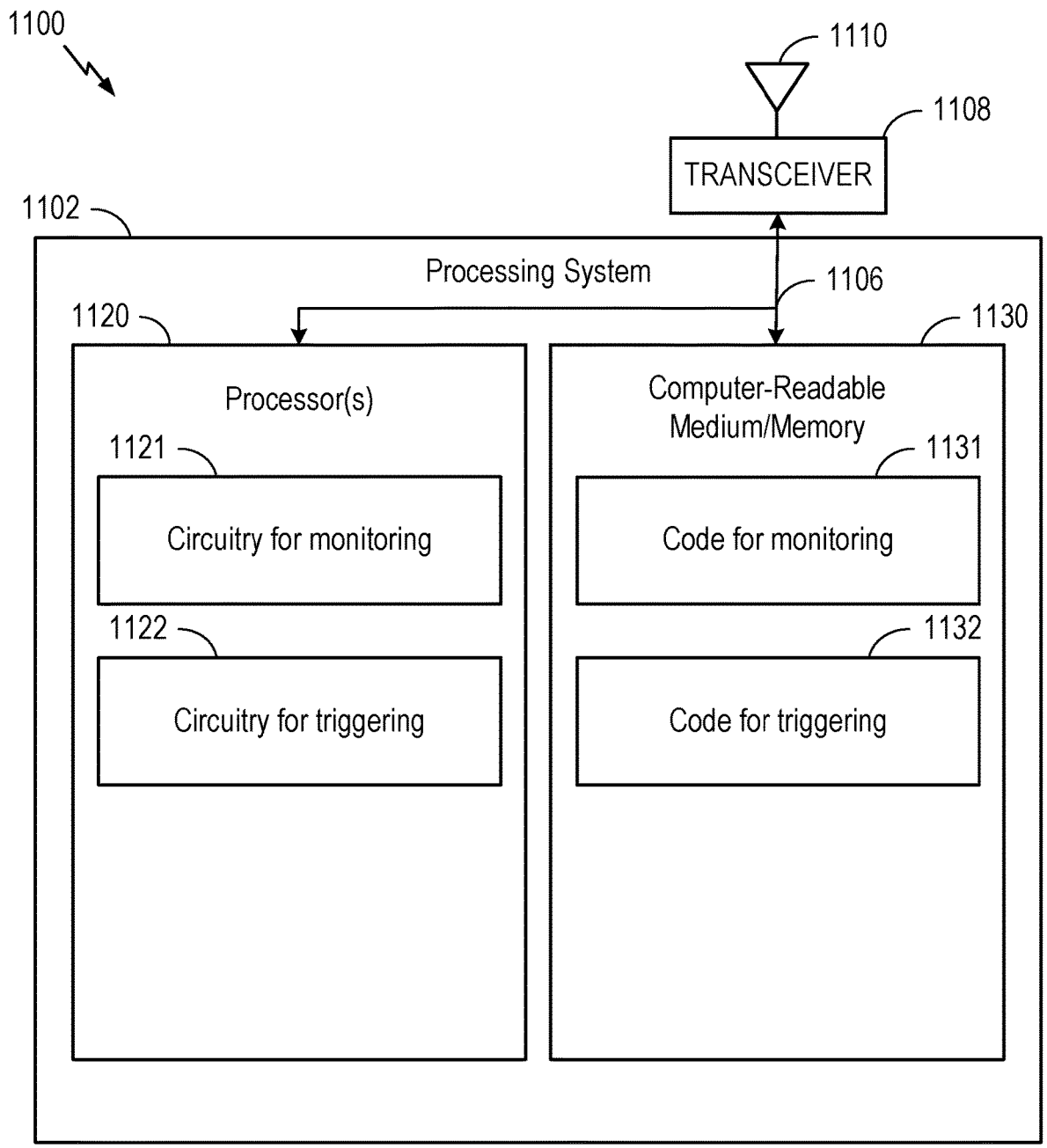

FIG. 11 depicts an example communications device 1100 that includes various components operable, configured, or adapted to perform operations for the techniques disclosed herein, such as the operations depicted and described with respect to FIGS. 8 and 9 and additional operations described with respect to FIGS. 4-7. In some examples, communication device 1100 may be a UE 104 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 8 and 9, or other operations for performing the various techniques discussed in FIGS. 4-9 for managing and utilizing split DRBs.

In the depicted example, computer-readable medium/memory 1130 stores code 1131 for monitoring, and code 1132 for triggering.

In the depicted example, the one or more processors 1120 include circuitry configured to implement the code stored in the computer-readable medium/memory 1130, including circuitry 1121 for monitoring, and circuitry 1122 for triggering.

Various components of communications device 1100 may provide means for performing the methods described herein, including with respect to FIGS. 4-9.

In some examples, means for transmitting or sending may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving may include the transceivers 254 and/or antenna(s) 252 of the user equipment 104 illustrated in FIG. 2 and/or transceiver 1108 and antenna 1110 of the communication device 1100 in FIG. 11.

In some example, means for monitoring may include a bus interface, such as the bus 1106, and/or circuitry for monitoring 1121, and/or code for monitoring 1131, and/or split DRB control component 281. In some example, means for triggering may include a bus interface, such as the bus 1106, and/or circuitry for triggering 1122, and/or code for triggering 1132, and/or split DRB control component 281.

Notably, FIG. 11 is just one example, and many other examples and configurations of communication device 1100 are possible.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Aspects

Aspect 1: A method for wireless communication performed at a user equipment (UE) of a wireless wide area network (WWAN), comprising: setting a device-configured split data threshold to a value that is less than or equal to a network-configured split data threshold value in response to the network-configured split data threshold value being greater than a first buffer threshold value associated with a data buffer of the UE; monitoring an amount of data in the data buffer; and triggering a first scheduling request (SR) associated with a first communication link and a second SR associated with a second communication link in response to the amount of data in the data buffer being greater than the device-configured split data threshold value.

Aspect 2: The method of aspect 1, wherein setting the device-configured split data threshold to a value that is less than or equal to the network-configured split data threshold value includes: setting the device-configured split data threshold to a value that is less than or equal to the first buffer threshold value in response to the network-configured split data threshold value being greater than the first buffer threshold value.

Aspect 3: The method of any of aspect 1 and aspect 2, wherein setting the device-configured split data threshold to a value that is less than or equal to the network-configured split data threshold value includes: setting the device-configured split data threshold to a value that is equal to the network-configured split data threshold value in response to the network-configured split data threshold value being greater than the first buffer threshold value; and setting, after triggering the first SR and the second SR, the device-configured split data threshold to a value that is less than or equal to the first buffer threshold value.

Aspect 4: The method of any of aspects 1-3, wherein setting the device-configured split data threshold to a value that is less than or equal to the network-configured split data threshold value includes: setting the device-configured split data threshold to a value that is less than or equal to a second buffer threshold value associated with the data buffer in response to the network-configured split data threshold value being greater than the second buffer threshold value, the second buffer threshold value being greater than the first buffer threshold value; and setting, after triggering the first SR and the second SR, the device-configured split data threshold to a value that is less than or equal to the first buffer threshold value.

Aspect 5: The method of aspect 4, wherein the first buffer threshold value is a threshold used for enabling a data flow between a host of the UE and a modem of the UE, and the second buffer threshold value is a threshold used for disabling the data flow between the host and the modem.

Aspect 6: The method of any of aspects 1-5, wherein the network-configured split data threshold value is configured by a base station (BS) of the WWAN.

Aspect 7: A method for wireless communication performed at a user equipment (UE) of a wireless wide area network (WWAN), comprising: monitoring data in a buffer associated with the UE in response to a network-configured split data threshold being less than a first threshold associated with the buffer; and triggering a first scheduling request (SR) associated with a first communication link and a second SR associated with a second communication link based, at least in part, on a buffer latency realized from the monitoring.

Aspect 8: The method of aspect 7, wherein the first SR associated with the first communication link and the second SR associated with the second communication link are triggered in response to a packet buffer latency associated with the data in the buffer being greater than the buffer latency.

Aspect 9: The method of any of aspect 7 and aspect 8, further comprising: selecting the first communication link as the primary communication link in response to determining that data traffic is being received by the UE via the first communication link or that the first communication link is in an active state as per its discontinuous reception (DRX) configuration.

Aspect 10: The method of any of aspects 7-9, wherein monitoring data in the buffer comprises: determining the buffer latency based on real-time measurements associated with the buffer or based on semi-static measurements associated with the buffer.

Aspect 11: The method of aspect 10, further comprising: determining a device-configured split data threshold based on at least one of the buffer latency or a primary link rate, wherein the first SR associated with the first communication link and the second SR associated with the second communication link are triggered based on the device-configured split data threshold.

Aspect 12: The method of any of aspects 7-11, further comprising: setting a device-configured split data threshold to a value that is greater than or equal to the first threshold in response to the network-configured split data threshold being less than the first threshold associated with the buffer.

Aspect 13: An apparatus for wireless communications, comprising: a memory comprising instructions; and one or more processors configured to execute the instructions and cause the apparatus to perform a method in accordance with any one of Aspects 1-6.

Aspect 14: An apparatus for wireless communications, comprising: a memory comprising instructions; and one or more processors configured to execute the instructions and cause the apparatus to perform a method in accordance with any one of Aspects 7-12.

Aspect 15: A user equipment (UE), comprising: at least one transceiver; a memory comprising instructions; and one or more processors configured to execute the instructions and cause the UE to perform a method in accordance with any one of Aspects 1-6, wherein the at least one transceiver is configured to transmit the first SR and the second SR.

Aspect 16: A user equipment (UE), comprising: at least one transceiver; a memory comprising instructions; and one or more processors configured to execute the instructions and cause the UE to perform a method in accordance with any one of Aspects 7-12, wherein the at least one transceiver is configured to transmit the first SR and the second SR.

Aspect 17: An apparatus for wireless communications, comprising means for performing a method in accordance with any one of Aspects 1-6.

Aspect 18: An apparatus for wireless communications, comprising means for performing a method in accordance with any one of Aspects 7-12.

Aspect 19: A non-transitory computer-readable medium comprising instructions that, when executed by an apparatus, cause the apparatus to perform a method in accordance with any one of Aspects 1-6.

Aspect 20: A non-transitory computer-readable medium comprising instructions that, when executed by an apparatus, cause the apparatus to perform a method in accordance with any one of Aspects 7-12.

Additional Considerations

The preceding description provides examples of using a device-configured split data threshold or a buffer latency for utilizing a split DRB in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication performed at a user equipment (UE) of a wireless wide area network (WWAN), comprising:
setting a device-configured split data threshold value to be less than or equal to a network-configured split data threshold value in response to the network-configured split data threshold value being greater than a first buffer threshold value associated with a data buffer of the UE;
monitoring an amount of data in the data buffer; and
triggering a first scheduling request (SR) associated with a first communication link and a second SR associated with a second communication link in response to the amount of data in the data buffer being greater than the device-configured split data threshold value.

2. The method of claim 1, wherein setting the device-configured split data threshold value to be less than or equal to the network-configured split data threshold value includes:
setting the device-configured split data threshold value to be less than or equal to the first buffer threshold value in response to the network-configured split data threshold value being greater than the first buffer threshold value.

3. The method of claim 1, wherein setting the device-configured split data threshold value to be less than or equal to the network-configured split data threshold value includes:
setting the device-configured split data threshold value to be equal to the network-configured split data threshold value in response to the network-configured split data threshold value being greater than the first buffer threshold value; and
setting, after triggering the first SR and the second SR, the device-configured split data threshold value to be less than or equal to the first buffer threshold value.

4. The method of claim 1, wherein setting the device-configured split data threshold value to be less than or equal to the network-configured split data threshold value includes:
setting the device-configured split data threshold value to be less than or equal to a second buffer threshold value associated with the data buffer in response to the network-configured split data threshold value being greater than the second buffer threshold value, the second buffer threshold value being greater than the first buffer threshold value; and
setting, after triggering the first SR and the second SR, the device-configured split data threshold value to be less than or equal to the first buffer threshold value.

5. The method of claim 4, wherein the first buffer threshold value is a threshold used for enabling a data flow between a host of the UE and a modem of the UE, and the second buffer threshold value is a threshold used for disabling the data flow between the host and the modem.

6. The method of claim 1, wherein the network-configured split data threshold value is configured by a base station (BS) of the WWAN.

7. An apparatus for wireless communication, comprising:
a memory comprising instructions; and
one or more processors configured to execute the instructions and cause the apparatus to:
set a device-configured split data threshold value to be less than or equal to a network-configured split data threshold value in response to the network-configured split data threshold value being greater than a first buffer threshold value associated with a data buffer of the apparatus;
monitor an amount of data in the data buffer; and
trigger a first scheduling request (SR) associated with a first communication link and a second SR associated with a second communication link in response to the amount of data in the data buffer being greater than the device-configured split data threshold value.

8. The apparatus of claim 7, wherein the one or more processors are configured to execute the instructions and cause the apparatus to:
set the device-configured split data threshold value to be less than or equal to the first buffer threshold value in response to the network-configured split data threshold value being greater than the first buffer threshold value.

9. The apparatus of claim 7, wherein the one or more processors are configured to execute the instructions and cause the apparatus to:
set the device-configured split data threshold value to be equal to the network-configured split data threshold value in response to the network-configured split data threshold value being greater than the first buffer threshold value; and
after the trigger of the first SR and the second SR, set the device-configured split data threshold value to be less than or equal to the first buffer threshold value.

10. The apparatus of claim 7, wherein the one or more processors are configured to execute the instructions and cause the apparatus to:
set the device-configured split data threshold value to be less than or equal to a second buffer threshold value associated with the data buffer in response to the network-configured split data threshold value being greater than the second buffer threshold value, the second buffer threshold value being greater than the first buffer threshold value; and
after the trigger of the first SR and the second SR, set the device-configured split data threshold value to be less than or equal to the first buffer threshold value.

11. The apparatus of claim 10, wherein the first buffer threshold value is a threshold used for enabling a data flow between a host of the apparatus and a modem of the apparatus, and the second buffer threshold value is a threshold used for disabling the data flow between the host and the modem.

12. The apparatus of claim 7, wherein the network-configured split data threshold value is configured by a base station (BS).

13. The apparatus of claim 7, further comprising a transceiver coupled to the one or more processors and configured to transmit the first SR and the second SR to a BS, wherein the apparatus is configured as a user equipment (UE).

14. An apparatus for wireless communication, comprising:
a memory comprising instructions; and
one or more processors configured to execute the instructions and cause the apparatus to:
monitor data in a buffer associated with the apparatus in response to a network-configured split data threshold being less than a first threshold associated with the buffer; and
trigger a first scheduling request (SR) associated with a first communication link and a second SR associated with a second communication link based, at least in part, on a buffer latency realized from the monitoring of the data in the buffer, wherein the buffer latency is an average time that data packets wait in the data buffer when only the first communication link is draining the data buffer.

15. The apparatus of claim 14, wherein the first SR associated with the first communication link and the second SR associated with the second communication link are triggered in response to a packet buffer latency associated with the data in the buffer being greater than the buffer latency.

16. The apparatus of claim 14, wherein the one or more processors are configured to execute the instructions and cause the apparatus to:
select the first communication link as a primary communication link in response to a determination that data traffic is being obtained by the apparatus via the first communication link or that the first communication link is in an active state as per its discontinuous reception (DRX) configuration.

17. The apparatus of claim 14, wherein the apparatus monitors the data in the buffer by:

determining the buffer latency based on real-time measurements associated with the buffer or based on semi-static measurements associated with the buffer.

18. The apparatus of claim 14, wherein the one or more processors are configured to execute the instructions and cause the apparatus to:
determine a device-configured split data threshold based on at least one of the buffer latency or a primary link rate, wherein the first SR associated with the first communication link and the second SR associated with the second communication link are triggered based on the device-configured split data threshold.

19. The apparatus of claim 14, wherein the one or more processors are configured to execute the instructions and cause the apparatus to:
set a device-configured split data threshold to a value that is greater than or equal to the first threshold in response to the network-configured split data threshold being less than the first threshold associated with the buffer.

20. The apparatus of claim 14, further comprising a transceiver coupled to the one or more processors and configured to transmit the first SR and the second SR to a base station (BS), wherein the apparatus is configured as a user equipment (UE).

* * * * *